R. DUTTON.
Harvester.
No. 2,047. Reissued Aug. 8, 1865.
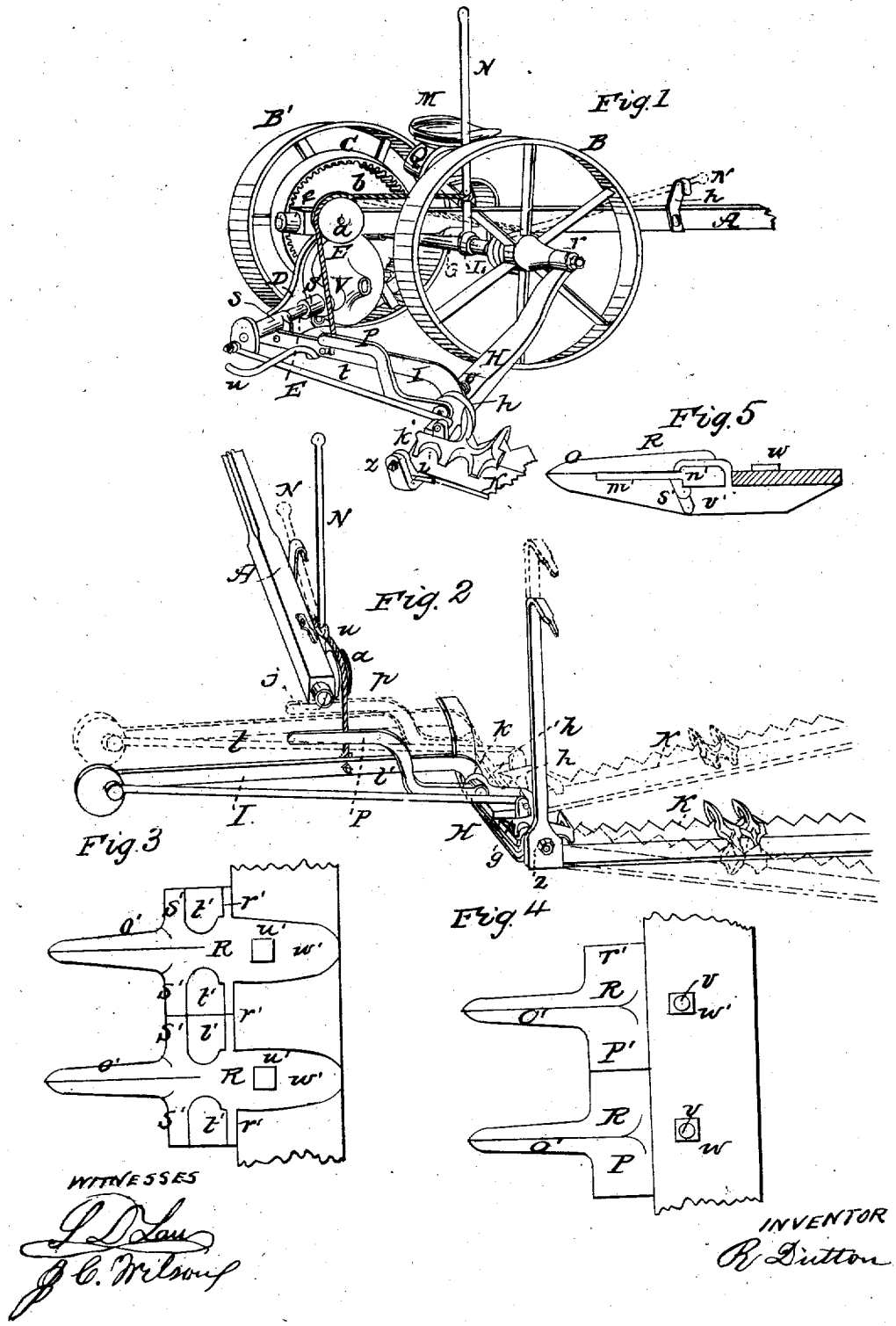
N. PETERS, Photo-Lithographer, Washington, D. C.

UNITED STATES PATENT OFFICE.

RUFUS DUTTON, OF NEW YORK, N. Y.

IMPROVEMENT IN HARVESTERS.

Specification forming part of Letters Patent No. 31,705, dated March 19, 1861; Reissue No. 1,763, dated September 13, 1864; Reissue No. 2,047, dated August 8, 1865.

*To all whom it may concern:*

Be it known that I, RUFUS DUTTON, of the city and State of New York, lately of Brooklyn, in said State, and formerly of Dayton, Ohio, have invented certain new and useful Improvements in Mowing and Reaping Machines; and I do hereby declare that the following is a full, clear, and exact description of a part of my said invention, other parts of said invention being described and included in other Letters Patent, reference being had to the accompanying drawings, and to the letters of reference marked thereon, and making a part of this specification.

The nature of this part of my invention consists in an improved arrangement of the gearing and frame of the machine, and also of a device for raising the finger-bar, so as to avoid or escape obstruction or to facilitate the transportation of the machine, and in the application and use of an improved guard-finger.

Figure 1 is a general perspective view of the machine with the finger or cutter bar broken off. Fig. 2 is a rear perspective view, showing the cutter-bar in three positions. Fig. 3 is a bottom view of a portion of the finger-bar with guard-fingers attached. Fig. 4 is a plan view of the same. Fig. 5 is an end view of the same.

Like letters in the several figures refer to the same parts of the machine.

A represents the tongue or pole of the machine; B, one of the driving-wheels, the main outer driving-wheel, B′, being of the same size and at the other end of the axle G, on which they are mounted.

The main gear-wheel C, which actuates the working parts of the machine, is situated close to the main or outer driving-wheel, and is coupled to such wheel by a pawl and ratchet, so constructed and arranged that as the machine moves forward the driving-wheel and the main gear-wheel are coupled together, but as the machine is moved backward they will be uncoupled. The driving-wheel B is in like manner constructed with a ratchet-recess similar to that of the main driving-wheel, in which engages a pawl-flange, rigidly attached to the axle on the inner side of such wheel, and which couples the axle and wheel together or uncouples them, as described with reference to the main driving-wheel. It is desirable for the purpose of centering or balancing the draft on the pole, and to avoid side draft, that the main or outer driving-wheel should do most of the work in driving the axle and operating the cutters; but in turning corners, when such driving-wheel has not much motion, and in passing over irregularities of the ground, when such wheel might not have much traction, it is necessary to have the opposite wheel also coupled with the axle, so as to make it an auxiliary driving-wheel. To increase the weight upon the outer wheel, and thereby make it the principal or main driving-wheel, and for the purposes hereinafter mentioned, the main gear-wheel C and the secondary gearing that gives vibration to the cutter-bar are placed on the same side of the machine with and close to such driving-wheel. By this arrangement of placing the gear-wheel at the extremity of the axle opposite the finger-bar its weight, which is considerable, helps also to equalize the draft of the machine. Other advantages are also secured by placing such main gear-wheel in close proximity to the main driving-wheel, and coupling them together, as desired. When the gear-wheel is situated near the middle of the axle it is more liable to strike obstructions in the path; but this objection is obviated to a great degree by placing it at one end. There is also considerable saving in expense, for when the gear-wheel is situated away from the main driving-wheel a flange or its equivalent must be used to couple the main driving-wheel to the axle, which is unnecessary when the driving and gear wheels are placed together.

At a suitable place inside of but near the main gear-wheel C there is secured to the axle G by means of an eye and socket the outer side, D, of the frame of the machine, and to the other extremity of the axle outside of the driving-wheel B is secured the inner side, H, of the frame, the connection between this side and the axle being by an eye or socket, *r*, in which the axle turns. The sides D and H extend beyond the driving-wheels, and are connected by means of the end piece, I, of the frame, which end piece is elevated, so as to pass over the grass. On the end of the side or plate D, and on the inner side thereof, is a metallic piece, having bearings S S for the crank-shaft F, which connects by a beveled pinion with a beveled wheel in the casing E, and which receives motion from the main gear-wheel C. The two sides of said metallic piece are at right angles and fit to and rigidly brace the corner formed by the intersection of the side piece D and the end piece, I, said end piece being bent around and bolted to the side piece D, and also to such metallic piece. The opposite or inner end of the piece I is bent or turned downward on the inner side, H, of the frame, and rigidly secured thereto, as shown at *h'*. The inner side, H, of the frame extends beyond the junction of the end piece, I, therewith, and underneath the hinge-piece *i* of the finger-bar, thus forming the draft-shoe H'. The end of such side piece H is turned up and forms a lug or ear, *z*, to which a similar lug or ear, *k'*, on the hinge-piece *i* is jointed by a pin or bolt. A lug or ear, *k*, on the other end of the hinge-piece *i* is in like manner jointed by a pivot, *h*, to the end piece, I, near its junction or intersection with the side piece H. The lug Z may also be formed of a separate piece bolted or fastened to the end of the draft-shoe H'. The pivot *h* and the opposite point are on a line with each other, so that the finger-bar K (on the inner end of which is the hinge-piece *i*) is easily folded over on the frame, when desired, for convenience in taking the machine from place to place, &c. By the arrangement also of making the inner side, H, of the frame form the shoe of the finger-bar, which shoe rests on the ground, and connecting such side H to the axle by an eye or socket, so that the lower end of such side piece and the inner end of the finger-bar connected to it can rise and fall, such finger-bar can adapt itself to the inequalities of the ground. The finger-bar K is also so hinged that its outer end can drop below, as well as be raised above, the horizontal plane in which it usually rests. It will be apparent that it is equally if not more important that the outer end of the finger-bar, being at a greater distance from the frame, should be allowed to rise above or fall below the surface on which the driving-wheels are passing than that the inner end alone can so rise and fall. When the inside wheel passes over a clod or along a ridge of ground, the outer end of the finger-bar, if not hinged so that it can fall or drop, will be elevated so as to cut a high and uneven stubble, while if such outer end is permitted to droop a close cut will be obtained the whole length of the bar. For practical operation, however, it is not necessary that the outer end of the finger-bar should droop more than from eight to twelve inches. To sustain the finger-bar when folded over the frame a support, *l*, extends from the side piece D of the frame to which it is bolted.

The finger-bar is raised, lowered, and controlled by the operator while sitting in the seat M by the following arrangement: On the axle G, at a suitable position near such seat, is fixed a ground-segment, L', turning on said axle, and having a socket, in which fits the end of a lever or handle, N, extending upward, so as to be conveniently operated by the driver. The segment L' may, however, be dispensed with, and the lever N be supported directly on the shaft or axle. In the upper part of this segment, or to the lever N, is attached a cord or chain, *b*, passing over a pulley, *a*, fixed to the pole A, and extending downward and fastened to the end piece, I, of the frame by an eyebolt, *i'*. The finger-bar will droop more or less by varying the length of the cord or chain *b*. In the place of the pulley *a* an arm pivoted at one end and moving in such pivots may be made use of, and in machines having a fixed or rigid pole such pulley or arm may be fixed to any part of the frame instead of to the pole. By such arrangements, when the lever N is thrown forward, (in the case of the cutter-bar being behind the wheels,) the rear end of the frame, and also the inner end of the finger-bar, is raised from the ground, and when the finger-bar is folded over the rear end of the frame the entire finger-bar will be sufficiently elevated to allow the machine to be transported from place to place. To hold the lever N when thus thrown forward, I usually employ a hook, *n*, secured to the pole; and in order to catch the lever under the hook and detach it therefrom the segment L is allowed a little lateral movement. At a proper position on the pole I also secure a strap for the purpose of preventing the lever N from falling over when in an upright position. By supporting the lever N upon or near the axle of the machine it is convenient to be controlled and operated by the driver, and can be easily and quickly handled by him while sitting in his seat, and that equally well whether the sickle is behind or before the wheels, it only being necessary to move such lever in an opposite direction, according as the cutters are before or behind. The main shaft of the machine also furnishes a strong and stable support for such lever.

If the finger-bar is extended, as when in operation, and the end of the frame is raised, as before described, by means of the lever N, it is apparent (the finger-bar being hinged at *g* and *h*) that the outer end of the finger-bar would not be raised, but would still rest on the ground, while the draft-shoe H would be elevated.

To raise the outer end of the finger-bar at the same time the draft-shoe is raised, and also to raise it still higher than such draft-shoe when necessary, I make use of the following arrangement: On the point *h* of the hinge-piece *i* is supported or attached a lever, *p*, so arranged that it can turn freely toward the finger-bar, but is prevented from turning independently in the opposite direction or toward the machine by striking against the hinge-piece *i*. Such lever *p* is bent or curved upward, as shown in the drawings, so as to get sufficient elevation, and is then turned inward, and extends somewhat beyond the end of the pole *a*, as shown in Fig. 2. On the rear end of the pole, or on some part of the frame directly over such lever *p*, is placed a horizontal friction-roller, *c*, or its equivalent, against which, when the end of the frame is raised by the action of the lever N, the lever P strikes and is pressed down, causing the hinge-piece *i* to be turned inward, and thereby elevating the outer end of the finger-bar. The finger-bar is thus raised or lowered and controlled by the driver while sitting in his seat and without trouble. By such a construction of the lever *p* and its manner of connection with the hinge-piece *i* or heel of the cutter-bar, substantially as described, while the lever can have motion freely toward the finger-bar, it becomes, when turned in the opposite direction, rigid with it and equivalent to a prolongation of such finger-bar. If, however, such lever were rigid in both directions or could not be turned toward the finger-bar, the latter could not be turned up or folded without causing such lever to come in contact with the ground, and thus interfering with the handling of the machine.

The arrangement and operation of the two levers used for raising the outer and inner ends of the finger-bar are also such that when the finger-bar is raised by them the outer end of such bar is elevated considerably higher than the inner end. This manner of elevating the finger-bar enables the operator to pass over or by obstructions—as stumps, stones, &c.—without turning out so far as to allow the end of the bar to pass by on the side of such obstruction.

There are certain elements necessary or very desirable to make a mowing-machine which will do good work, and at the same time can be handled with ease and convenience on rough and uneven ground which are not so essential on smooth and level ground. Such a machine should have two independent driving and supporting wheels, with a cutting apparatus so hinged by one of its ends to the machine that not only the entire cutting apparatus, but either end thereof independently of the other end, can freely rise above or fall below the plane on which the driving-wheels are passing, and it should be so constructed that when the shoe or inner end of the finger-bar rises or falls in passing over irregularities of the ground the end of the frame of the machine to which the bar is attached (and by the "frame of the machine" I here mean that part which supports the bearing of the crank-shaft to which the upper end of the connecting-rod is attached) will receive the same motion—that is, rise and fall so that the rotation of the two bearings of the crank-shaft connecting the crank and knife-head will always remain the same. It is also important in connection with these features that the driver's seat should be controlled by the pole and not by the frame of the machine, so that it shall not partake of the motion the frame receives as the shoe or inner end of the finger-bar passes over irregularities in the ground.

Heretofore the driver's seat has been supported on or controlled by the frame of the machine, and has been placed on the opposite side of the axle from the finger-bar for the purpose of preserving the due balance of the machine, (the end of the frame to which the finger-bar is attached being necessarily much the heaviest;) but the radius from the axle to the finger-bar is so short that when the driver's seat is placed on the frame the motion communicated to the frame by the inner end wheel of the finger-bar passing over the inequalities of the ground is so great as to render it very difficult for the driver to occupy his seat with proper comfort and safety. Again, when the driver is seated upon the frame of the machine, and upon the side opposite that to which the finger-bar is attacked and on the opposite side of the axle, his weight, which acts as a balance to the finger-bar, acts so unequally when passing over rough or uneven ground as frequently to elevate the finger-bar above the surface of the ground, thereby causing it to cut an uneven stubble. There should also be such mechanism that the driver while in his seat can raise the entire cutting apparatus from the ground and support it on the driving-wheels for the purpose of passing over obstructions, turning corners, and transporting the machine from place to place. These elements may be found in different machines; but I am not aware that they have ever before been all united in the same machine.

In two-wheeled machines heretofore made having the driver's seat controlled by the pole the cutting apparatus has been so hinged that it would turn freely only in an upward direction, and the outer end could not droop more than the ordinary spring of the finger-bar caused by its own weight, and to raise the outer end of such a finger-bar no other device was necessary than that used for raising the inner end. This machine also does not require or make use of a supporting caster-wheel, as is usually the case with loose-pole machines, for supporting the drooping end of the frame or the driver's seat.

In machines using a supporting caster-wheel such wheel, or some part of the machine supported in whole or in part by it, and other than the pole of the machine, is made a fulcrum for raising the finger-bar and a support for moving it from place to place. This machine does not require, or dispenses with, such a supporting caster-wheel, and the pole is made the fulcrum to raise and support the finger-bar. The arrangement of the frame, finger-bar, and driver's seat with respect to the axle of the machine is also such that while the machine is at work and the finger-bar and shoe supporting the drooping end of the frame are resting on the ground the machine is so balanced that the pole rests but lightly on the horses' necks, and when also the finger-bar is raised or folded, and the lever raising the outer end of the finger-bar is brought in contact with the end of the pole, the balance of the machine will not be seriously interfered with. The arrangement is also such that the whole weight of the machine is supported by the two driving-wheels, allowing the machine to turn freely and easily from right to left, and vice versa, and to be easily transported from place to place.

When the finger-bar is set up or folded on the machine the hinge-piece *i* is turned partially or wholly bottom side up. In such case the lever *p* drops down and rests on the end of the eyebolt *i'* of the end piece, I.

That the operator when walking behind the machine may have control of the finger-bar, an upright handle, O, of sufficient height for the purpose designed, is secured in any convenient manner to the rear end of the draft-shoe H'. By raising this handle the outer end of the finger-bar is elevated by means of the bent lever *p* and friction-roller *c*, or their equivalents, in the same manner as by operating the lever N, as before described.

My improved guard finger R is made in a single piece in such a shape as to secure the best action of the sickle-bar working therein, and so as to be attached firmly and strongly to the finger-bar, so as to avoid clogging, and at the same time give the greatest amount of strength with the least quantity of metal. The slot *m'* and passage *n'*, for the reception reception respectively of the sickle and sickle-bar, are substantially of the form shown in the end view, Fig. 5, the passage *n'* being of such a size as to leave sufficient space over the top and at the back of the sickle-bar when working therein to allow the free escape of grass or other matter that may enter or be carried in by the sickle. The finger *o* is of the usual shape; but the rear upper portions, *p p*, of the guard extend outward laterally a sufficient distance from the finger to meet the similar adjacent portions of the contiguous surface and a covering for the sickle-bar. The rear edge of the guard turns over at right angles, as shown at *i'*, Figs. 3 and 5, thereby forming a plane bearing-surface against the finger-bar R, and extending the whole width of the guard. The front portion, S' S', of the guard below the sickle-slot, and corresponding with the front edge of the portions *p' p'* above, extends likewise outward from the finger an equal distance with the parts *p' p'*, and serves as a shield to protect the side bar. A portion, *t'*, under the sickle-bar, on each side of the finger-guard, is cut away, as shown in the bottom view, Fig. 3, for the purpose of allowing the free escape of the grass or any other substance tending to clog the sickle. The rear bottom portion, *u'*, of the guard, substantially of the form shown in the Figs. 3 and 5, extends backward nearly or quite to the rear edge of the finger-bar, and forms a bearing-surface against the bottom of said finger-bar, to which it is secured by means of a bolt, *v'*, on the upper end of which screws a nut, *w'*. The upper surface, *p' p'*, of the guard, entirely covering the sickle-bar, prevents the cut grass or any other substance from coming in contact therewith and from being drawn under the fingers, causing the sickle-bar to choke and clog, the rear upper portion of the guard being raised higher than the finger-bar and nuts *w' w'*, obstructing the mowed grass in its passage over them. The portion *r'*, by forming a plain bearing-surface its entire length against the edge of the finger-bar, prevents any lateral movement of the finger, and makes necessary only a single small bolt, *v'*, to hold the guard-finger firmly in its place. The guard-finger is much stronger than the open guard-finger, and its under side may be made lighter, the upper portion, *p' p'*, having a large surface and extending round, as shown at *r'*, and forming a portion of the guard as a whole, thereby bracing and sustaining it against all lateral strain.

What I claim as my invention, and desire to secure by Letters Patent, is—

1. In machines having a hinged or flexible finger-bar, raising such finger-bar by means of a lever supported or pivoted at one end on the shoe-wheel of the finger-bar, and turning freely toward the finger-bar, but rigid with it when turned in an opposite direction, by causing such lever, when the heel of the finger-bar is raised, to be brought in contact with the pole or the frame of the machine or a projection therefrom, so as to press or force down such lever and thereby raise the outer end of the finger-bar, substantially as set forth.

2. In two-wheeled machines having a hinged finger-bar and having the driver's seat controlled by the pole instead of by the frame of the machine, and not using or employing a caster-wheel to support the drooping end of the frame and the inner end of the finger-bar, raising the inner end of the finger-bar by means of a lever and cord or chain or its equivalent acting upon the pole or some part connected therewith as a fulcrum, when the outer end of such finger-bar is raised by means of a lever supported or pivoted at one end on the shoe or heel of the finger-bar, and turning freely toward the finger-bar, but rigid with it, when turned in an opposite direction and operated as set forth in the first claim.

3. In two-wheeled machines having a hinged finger-bar and a loose pole, and having the driver's seat controlled by the pole instead of by the frame of the machine, so arranging with reference to the frame of the machine the finger-bar and the mechanism for raising it and the shoe that when the finger-bar and shoe are raised by such mechanism their weight will be so thrown upon the driving-wheels that the use of a caster-wheel to support the drooping end of the frame can be dispensed with, and the machine can also be moved and turned with greater ease and facility.

4. In a machine having two independent driving or supporting wheels and having the driver's seat controlled by the pole of the machine, hinging the cutting apparatus by one of its ends, so that not only the entire cutting apparatus, but either end thereof independently of the other end, can freely rise above or fall below the plane or surface on which the driving-wheels are moving, in combination with mechanism or devices for raising both the outer and inner ends of the finger-bar, by which the driver, when in his seat, by operating a single lever moving in one direction in a plane substantially parallel with the sides of the driving-wheels, can raise the entire cutting apparatus and support it upon the driving-wheels, for the purposes set forth.

5. In two-wheeled machines having a hinged finger-bar and a loose pole, and having the driver's seat controlled by the pole instead of the frame of the machine, so arranging the levers that raise the inner and outer ends of the finger-bar that as these levers are operated the outer end of the finger-bar shall be raised higher than the inner end, for the purposes set forth.

6. I do not claim forming a guard-finger in a single piece, nor do I claim forming it in such a manner as to cover the sickle-bar and leave openings in its under side for the escape of grass and other substances, as such a form of guard-finger has been known; but I claim a guard-finger made in a single piece covering the sickle-bar and having openings in the bottom thereof for the escape of grass and other substances entering with the sickle, when such guard-finger is provided with a bearing-surface, as *i*, connecting the upper and lower portions of said guard-finger, and resting against the edge of the finger-bar and braced and sustained against lateral strain, as herein set forth.

R. DUTTON.

Witnesses:
S. D. LAW,
M. N. HUTCHINSON.